2,848,471

PREPARATION OF TETRAETHYL LEAD

Pietro Pagliarini, Fidenza, Italy, assignor to C. I. P. Compagnia Italiana Petrolio S. p. A., Fidenza, Italy, a company of Italy No Drawing. Application November 14, 1956
Serial No. 621,997

7 Claims. (Cl. 260—437)

The present invention relates to a process for making tetraethyl lead and in particular to the catalysis of the reaction between a monosodium lead alloy and ethyl chloride.

The process employed industrially at present for producing tetraethyl lead consists in reacting a sodium lead alloy and ethyl chloride at a temperature of from 65 to 85° C. and at the corresponding pressure according to the equation:

$$4NaPb + 4C_2H_5Cl = (C_2H_5)_4Pb + 3Pb + 4NaCl$$

This stage of ethylation can be carried out in an autoclave in successive batches or in a continuous manner.

In both cases, the time required to complete the reaction is extremely important since a reduction of this time (which with autoclave reaction is 5 hours or more) leads automatically to an increase in the capacity of a given plant, with consequent reduction in costs.

The present invention has the object of reducing said reaction times, by the use of a catalyst for the reaction.

It is another object to form a reaction mass which owing to the shape of the particles composing it permits the tetraethyl lead contained therein to be much more easily separated than with the conventional system when it is subjected to steam distillation.

Again owing to the degree of fineness of its particles the reaction mass resulting from this invention is much more reactive than the one obtained without the use of the catalyst employed in the present invention, if it is desired again to obtain therefrom, tetraethyl lead by reaction with organometallic compounds of the Grignard series, such as ethyl magnesium chloride or others.

It is another important advantage of this invention that the catalyst according to the invention improves the yields of tetraethyl lead produced as compared with the standard industrial process of today, based on equal quantities of Pb—Na alloy employed.

Other advantages result from a particular embodiment of the process according to the invention, which consists essentially in reacting a sodium-lead alloy with ethyl chloride in the presence of small quantities of an organic ester derived from oxyacids of phosphorus, principally orthophosphoric acid, and preferably completely esterified.

The esters should be liquid esters soluble in petroleum hydrocarbons and they may be used alone or in admixture with one another.

Typical examples of such compounds are tricresyl phosphate, trixylenyl phosphate, triphenyl phosphate, tribenzyl phosphate, dibutyl phenyl phosphate, 2 - naphthyl-diphenyl phosphate, 2 - naphthyl - 3' - methylphenyl-phenyl phosphate and others. Tricresyl phosphate, being a common article of trade, is particularly recommended.

The quantity of catalyst to be employed in accordance with this invention is of the order of 0.1% based on the weight of the lead-sodium alloy, but catalysis is effected when there are employed quantities of from 0.01% to 1.0% again based on the weight of the lead-sodium alloy.

Excessive quantities should be avoided. The quantity of catalyst employed is however also related to the quantity of ethyl chloride in excess which may be used for the best results.

In case of large excesses of ethyl chloride the quantity of catalyst should preferably not be lower than 0.02% based on the ethyl chloride and better results are obtained with percentages of the order of 0.2% to more than 1.0%.

To illustrate the above, the following examples are given:

*Example 1.*—100 g. of Pb—Na alloy containing 10.0% of Na, reduced to convenient size, were reacted in a small autoclave together with 100 g. of ethyl chloride. After keeping the autoclave at a temperature of 75° C. for 5 hours, the mass was cooled down and analyzed and a yield of product was found corresponding to 80.53% of theory (average result of three experiments carried out under equal conditions). With the same technique and quantities of reactants as in the preceding test, three more tests were carried out wherein 0.2 g. of tricresyl phosphate were added to the materials employed. The average of the yields obtained after 5 hours reaction time was 92.60% of theory.

In another series of tests the reaction time was reduced to 60 minutes and the average of the yields obtained was 64.20% without catalysis and 84.32% when using tricresyl phosphate as a catalyst.

Increasing the percentage of tricresyl phosphate effects no appreciable increase in yield, but it was necessary to increase proportionally the quantities of catalyst when operating with 100 g. of Pb—Na alloy and 168 g. of ethyl chloride to obtain the maximum yields of the preceding tests, without which increase they dropped down to 88% of theory.

Other experiments carried out with 0.2 g. of tricresyl phosphate but employing 50 g. of ethyl chloride gave the same results as when employing 0.1 g. of said substance.

*Example 2.*—Tests were carried out as in the preceding example, employing 150 g. of ethyl chloride for each 100 g. of Pb—Na alloy, and the reaction mass was further reacted with 237 g. of $MgC_2H_5Cl \cdot 2C_2H_5OC_2H_5$, produced by the reaction of metallic Mg, ethyl chloride and ether, without removal of the excess ethyl chloride used in the first stage of the reaction. The reaction was extended over 120 minutes at 10 atmospheres pressure. The yield of product obtained was 112 g. The same experiment carried out under identical conditions, but employing in the first stage 0.3 g. of tricresyl phosphate, gave a yield of product of 121.5 g.

Other compounds, such as those normally employed in the practice of manufacture to favour the formation of the compound tetraethyl lead, do not interfere with the use of the catalyst of the present invention. Thus certain accelerators or stabilizing agents or additives which improve the yields, such as acetates and butyrates and other esters; acetals, acetone, dipropyl ketone and others; styrene, naphthol, ethylene bromide, aldehydes such as butyraldehyde, furfural or others; naphthalene, diisobutylene, lecithin, nitromethane, amines, amides etc.; salts such as $AlCl_3$, bromides and iodides etc., metals and metalloids such as for instance K, Mg, I, Ca may be employed advantageously together with the catalyst.

It will be obvious to those skilled in the art that different forms of application of the present invention may be practiced without modifying the gist and object thereof.

I claim:

1. The process of preparing tetraethyl lead which comprises reacting a lead-sodium alloy and ethyl chloride in the presence, as a catalyst, of a compound selected from the group consisting of tricresyl ortho phosphate, trixylenyl ortho phosphate, triphenyl ortho phosphate, tribenzyl ortho phosphate, dibutylphenyl ortho phosphate, 2-naphthyl-diphenyl ortho phosphate and 2-naphthyl-3'-methylphenyl-phenyl ortho phosphate.

2. The process of claim 1, wherein the catalyst employed is tricresyl ortho phosphate in a proportion of from 0.02% to 1.0% by weight based on the weight of the ethyl chloride employed.

3. In the process for preparing tetraethyl lead involving a reaction between the metallic lead set free by the reaction of a sodium-lead alloy with ethyl chloride, a Grignard reagent and ethyl chloride, the improvement which consists in conducting the first stage reaction between the lead-sodium alloy and ethyl chloride in the presence, as a catalyst, of a compound selected from the group consisting of tricresyl ortho phosphate, trixylenyl ortho phosphate, triphenyl ortho phosphate, tribenzyl ortho phosphate, dibutylphenyl ortho phosphate, 2-naphthyl-diphenyl ortho phosphate and 2-naphthyl-3'-methylphenyl-phenyl ortho phosphate.

4. The process of claim 3, wherein the catalyst employed is tricresyl ortho phosphate in a proportion of from 0.02% to 1.0% by weight based on the weight of the ethyl chloride employed.

5. The process of claim 3 wherein the Grignard reagent is ethyl magnesium chloride and it is formed simultaneously with the reaction between the lead-sodium alloy and ethyl chloride by the inclusion of metallic magnesium in said reaction.

6. The process for preparing tetraethyl lead which comprises reacting a lead-sodium alloy and ethyl chloride in the presence, as a catalyst, of an aryl ortho phosphate.

7. The process of claim 6 wherein the metallic lead formed in said reaction is reacted with ethyl magnesium chloride and ethyl chloride.

References Cited in the file of this patent

UNITED STATES PATENTS

| | | |
|---|---|---|
| 1,559,405 | Calcott | Oct. 27, 1925 |
| 2,012,356 | Shappirio | Aug. 27, 1935 |
| 2,345,388 | Ericks et al. | Mar. 28, 1944 |
| 2,464,398 | Clem et al. | Mar. 15, 1949 |
| 2,688,628 | Shapiro et al. | Sept. 7, 1954 |